United States Patent [19]

Mlcak et al.

[11] 4,361,388
[45] Nov. 30, 1982

[54] DIGITAL-MARKING CAMERA ATTACHMENT

[75] Inventors: Ludek Mlcak, Waldwick, N.J.; Peter G. Hoerenz, Hartsdale, N.Y.

[73] Assignee: Carl Zeiss-Stiftung, Oberkochen, Fed. Rep. of Germany

[21] Appl. No.: 218,200

[22] Filed: Dec. 19, 1980

[51] Int. Cl.³ .............................................. G03B 17/24
[52] U.S. Cl. .................................... 354/106; 354/109
[58] Field of Search ............... 354/105, 106, 107, 108, 354/109; 350/96.27

[56] References Cited

U.S. PATENT DOCUMENTS

| | | | |
|---|---|---|---|
| 3,029,717 | 4/1962 | Hilbebrandt | 354/106 |
| 4,001,846 | 1/1977 | Kauneckas | 354/109 |
| 4,217,046 | 8/1980 | Weinstein et al. | 354/106 |
| 4,232,956 | 11/1980 | Hashimoto et al. | 354/106 |

FOREIGN PATENT DOCUMENTS

| | | | |
|---|---|---|---|
| 52-58523 | 5/1977 | Japan | 354/106 |
| 52-75319 | 6/1977 | Japan | 354/106 |
| 54-118825 | 9/1979 | Japan | 354/106 |
| 54-136320 | 10/1979 | Japan | 354/106 |

OTHER PUBLICATIONS

"Fiber Optics-A New Tool for Industry", by T. J. Gallacher, IEEE Transactions on Industrial Electronics, May 1963, pp. 57-61.

Primary Examiner—Russell E. Adams
Attorney, Agent, or Firm—Hopgood, Calimafde, Kalil, Blaustein & Judlowe

[57] ABSTRACT

The invention contemplates a device for directly recording upon photographic film, such as 35-mm film, data such as time and/or other identification within the exposure frame to which the data is applied. In the described embodiment, the data form is digital, luminously provided by a plurality of LED devices, and a fiber optics bundle transmits each LED-generated digit display direct to the plane in which a pressure plate engages the back surface (i.e., opposite the emulsion surface) of the film. The pressure plate is resiliently suspended, for gently loaded contact with film at the exposure-frame region, and all LED components and their associated fiber-optics bundles are fixedly mounted to, and therefore resiliently suspended with, the pressure plate.

14 Claims, 8 Drawing Figures

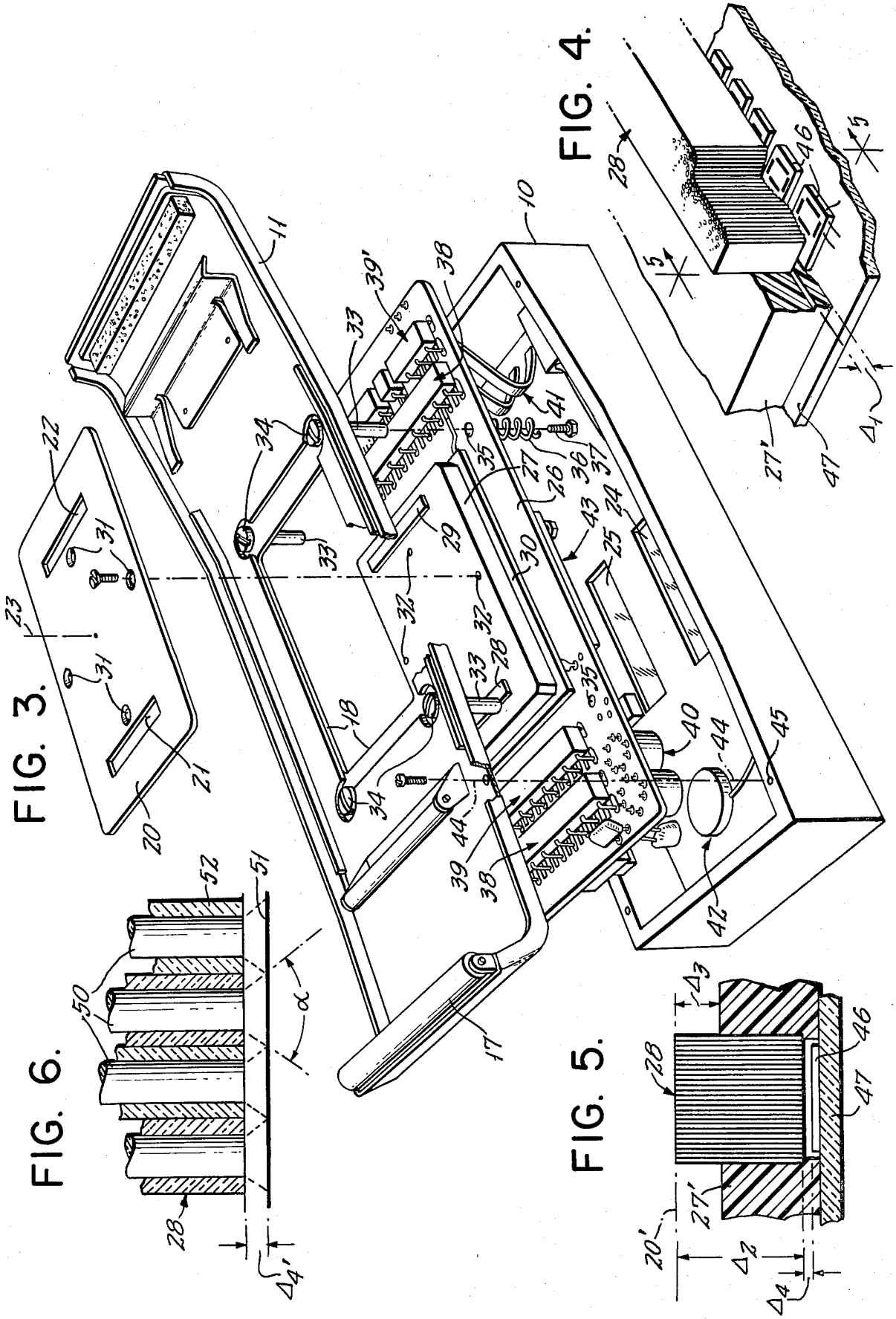

DIGITAL-MARKING CAMERA ATTACHMENT

BACKGROUND OF THE INVENTION

The invention relates to data-recording on photographic film, in direct association with a photographic exposure to which the data apply.

The desirability of data-recording in conjunction with photographic exposures has long been recognized, and the utility of light-emitting diodes (LED) for generation of data displays has also been recognized. Hoerenz, et al., U.S. Pat. No. 3,827,070 discloses such structure in application to the removable back of an otherwise conventional 35-mm camera, but the Hoerenz, et al. device has undesirable limitations, due to the fact that use of the LED devices is limited by the conventional refracting-optical elements needed to image multiple LED elements in desired array at the film surface. As a result, associated data-generating, data-display, and optical-imaging components require relatively great housing volume (bulk), and the number of digits which can be conveniently displayed at the film surface at any given time is relatively small. It goes without saying that the fewer the displayable digit positions at the film, the more limited is the capacity to record, for any given exposure. And in 35-mm film applications, the requisite bulk of prior data-recording devices has severely limited or foreclosed normal eye-level use of the viewfinder through which lens-focusing, subject-matter framing, and aperture-setting functions are performed.

BRIEF STATEMENT OF THE INVENTION

It is an object of the invention to provide improved data-recording apparatus of the character indicated, avoiding most of the limitations of prior devices.

A specific object is to provide such a device which is not only inherently capable of recording a substantially greater number of display-digit positions at the focal plane of the exposure frame, but which is also inherently capable of achieving the same with such reduced bulk that, for example in application to a conventional 35-mm camera, the normal viewfinder functions (lens-focus, aperature-setting, and subject-framing) are retained.

Another specific object is to achieve the above objects with uniformly high-quality image rendition of recorded digits, regardless of such variations as may occur in film thickness.

A further specific object is to provide capacity for a variety of selectively programmable automatic camera-exposure control functions in connection with digital-recording of the character indicated.

A general object is to achieve the foregoing objects with structure requiring minimum structural change of commercially available cameras and featuring simplicity and flexibility of use.

The invention achieves the foregoing objects and other features by using fiber-optics bundles in place of refractive-optical elements, to transmit clearly resolved luminous-display data direct to the film surface, namely to the plane at which the camera's pressure plate engages the back surface of the film. Uniformity of data-transmission and image-rendition is assured by having the fiber-optic elements and the luminous-display devices fixed with respect to each other and to the pressure plate, so that all of these elements and devices float with the pressure plate, in the course of lightly loaded resilient pressure-plate displacement which depends upon the presence and thickness of the film used.

DETAILED DESCRIPTION

The invention will be illustratively described in detail in conjunction with the accompanying drawings, in which FIG. 1 is a rear view in elevation of a commercially available 35-mm camera, to the back of which data-recording apparatus of the invention has been applied;

FIG. 3 is an enlarged and exploded view in perspective to show interrelationship of components within the back of the camera of FIG. 1;

FIG. 4 is a further enlarged fragmentary and partly broken-away view in perspective to show further detail of components of FIG. 3;

FIG. 5 is a transverse sectional view of the components of FIG. 4, taken at 5—5 in FIG. 4;

FIG. 6 is a simplified, fragmentary still further enlarged view of coacting components of FIGS. 4 and 5.

Figure 2:
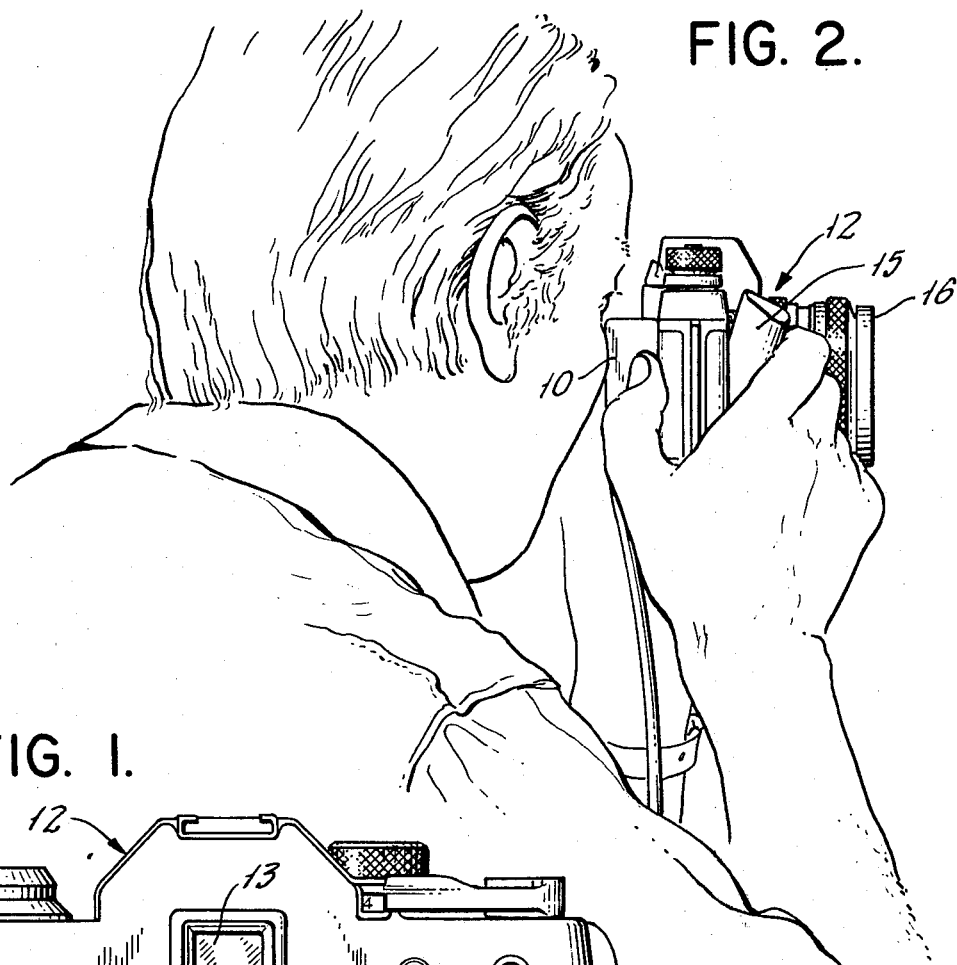
FIG. 2 is a view from the right-side of the camera of FIG. 1, to illustrate eye-level viewfinder use.
Figure 1:
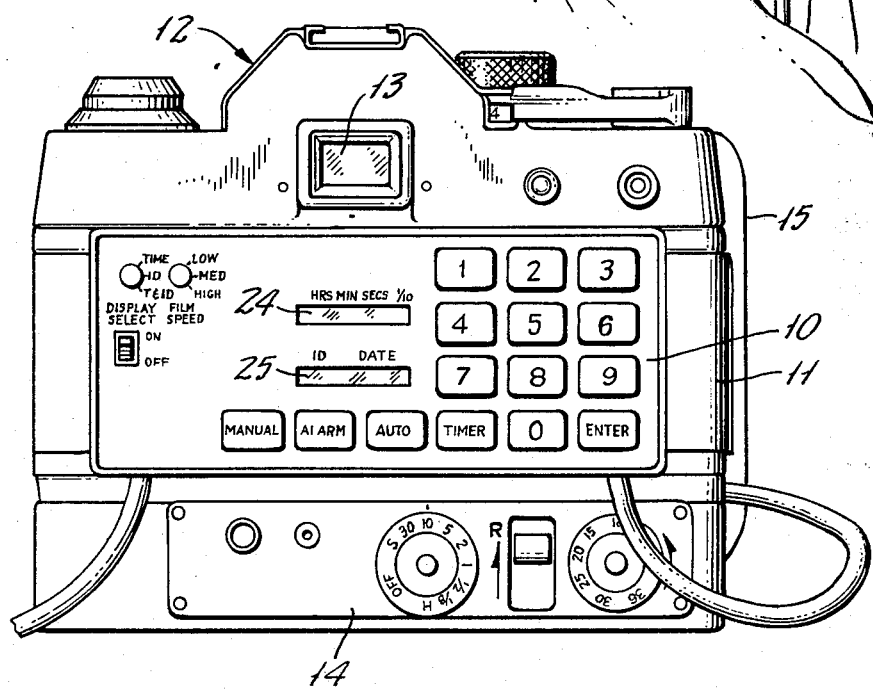
FIG. 1A is a diagram depicting the exposure-frame area of film in the camera of FIG. 1, with film-recorded data as created on said area, for the control settings shown in FIG. 1.

Referring initially to FIGS. 1 and 2, the inventive structure is contained within a box-like housing 10 forming part of the removable back plate or panel 11 of a commercially available 35-mm camera 12. The housing 10 is relatively thin, and therefore eye-level use of the camera's viewfinder 13 is readily available, as shown in the user situation depicted in FIG. 2; in this situation, conventional camera functions will be understood to be available to the user, namely through-the-lens focusing, relative-aperture setting, and subject-matter framing. The camera 12 is shown equipped with a commercially available base-plate mounted motor-drive accessory 14, for motorized film advance after each exposure, as via finger actuation of a manual exposure-release button in an upstanding hand-grip projection 15 of the accessory 14; alternatively, the accessory 14 includes receptacle means for detachable connection of a flexible electric-control cable 15, the exposure-release control signals being an optional output feature of the contents of housing 10.

Internal body structure of the camera 12 will be understood to include an open rectangular exposure frame (not shown) in the focal plane of the camera objective 16, and film from a supply cartridge on one longitudinal side of the open rectangular frame is drawn across the open frame to a take-up spool on the other longitudinal side, for each film advance between successive exposures. Customarily, a pressure plate is resiliently suspended from the camera back, in overlapping register with the open rectangular exposure frame, applying light loading to the back surface of the film and thus assuring conformance of the film to the focal plane.

Referring now additionally to FIG. 3, the camera back plate 11 is viewed from within, to reveal pin means 17 by which it is removably hinged to one longitudinal end of the camera body, as well as a rectangular back-frame opening 18 in register with the body-frame opening which establishes the exposure frame at the focal plane. The back-frame opening may suitably conform to the dimensions of the exposure-frame opening, but this is not a requirement. Within the volume closed by back plate 11, a flat pressure plate 20 is resiliently suspended with respect to and in unit-handling relation with the back plate; and the rectangular dimensions of pressure plate 20 exceed those of the back-frame opening 18, so that it may be in fully overlapping register therewith, for light-trapping purposes. Pressure plate 20 is shown with two longitudinally spaced like rectangular apertures 21-22, symmetrically located on opposite sides of the central optical axis 23 of the camera objective 16 and, therefore, also of the exposure-frame opening within the camera body.

Figure 1A:
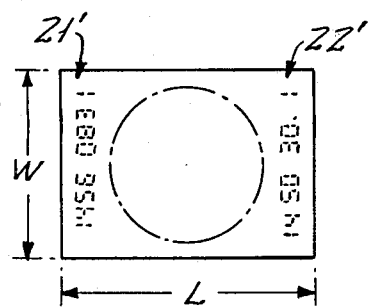

It is through the apertures 21-22 that luminous digital data to be recorded are carried for direct exposure to the film, and the arrangement is such that, for a given frame of subject-matter exposure, i.e., within the exposure-frame dimensions L-W as shown in FIG. 1A, separate multiple-digit display exposures 21'-22' will have been made through the respective apertures 21-22. In the form shown, eight digit positions, in groupings appropriate to the several kinds of data to be recorded, characterize each of the recorded displays 21'-22' for any given exposure; although not a necessary size relationship, this selection of eight digit positions for each display is found to produce, on 35-mm film, developed-film digit images which are large enough to be readily identified by the eye, without the requirement for magnification to identify a particular one out of a series of differently marked exposures. It is a feature of the invention that corresponding displays of the same data, as currently exposed for recording via apertures 21-22, shall be continuously viewable on the outer panel of housing 10 through suitable transparent windows 24-25 which, for reading convenience and consistency with all other indicia on said outer panel, are oriented orthogonal to the apertures 21-22.

It has been indicated generally above that pressure plate 20 and all instrumentalities for generation and conveyance of luminous data to be recorded are resiliently suspended as one and the same unit. In the form shown, these instrumentalities (including a microcomputer) are mounted to a chassis or printed-circuit board 26 which centrally positions a rectangular prismatic pedestal 27, sized for peripheral clearance with the back-frame opening 18, when assembled therein. The pedestal 27 carries all luminous-display data for a given exposure, and separate rectangular-prism projections of fiber-optics bundles 28-29 extend above the exposed upper pedestal surface, in register with the respective pressure-plate openings 21-22. A ledge 30 at the pedestal base establishes a limiting extent to which pedestal 27 may be displaced through and beyond the back-frame opening 18, in that the pedestal height above ledge 30 exceeds the effective back-plate (11) thickness at the frame opening 18; and pressure plate 20 is secured to the upper pedestal surface, as by countersunk bolts via apertures 31 in plate 20 and tapped holes 32 in pedestal 27. When thus assembled, the exposed upper surfaces of the fiber-optics bundles 28-29 lie in the plane of the film-engaging upper surface of pressure plate 20, as will become clear from later discussion in connection with FIGS. 4 and 5.

Resilient suspension of the indicated components utilizes four parallel, internally threaded guide tubes or posts 33, secured by means 34 to back plate 11 just outside the respective corners of the back-frame opening 18. Guide openings 35 in the chassis 26 slidably engage the respective posts 33 and maintain the peripheral clearance noted above, between pedestal 27 and back-frame opening 18. When chassis 26 is so assembled to plate 11 as to involve abutment at ledge 30, the posts 33 project below chassis 26; this is the relationship to which chassis 26 is normally urged, by coil springs 36 (one on each post 33) retained in lightly loading compression between the underside of the chassis and the heat of retaining bolts 37 (one carried at the projecting end of each post 33).

Aside from pedestal 27 and its contents, remaining elements 38-39 and 38'-39' mounted to the respective end regions of the upper surface of chassis 26, and as at 40 mounted to the lower surface thereof, will be understood to be commercially available integrated-circuit components disposed and connected in controlling relation with luminous-digit components within pedestal 27, all as set up and programmed via selectively operable means which is externally accessible at the panel having the display windows 24-25. And means including a flexible multiple-conductor strip 41 connects chassis electronic components with further coacting electronic components, as at 42, on the back panel of housing 10. It should also be observed that luminous display devices, such as LED elements may be mounted on a substrate at the underside of chassis 26 for exposure at windows 24-25 when the exploded parts of FIG. 3 are fully assembled. Such assembly is completed by a series of spaced bolts, as at the bolt alignment 44, whereby the back plate 11 is secured at one of a series of tapped holes 45 in the rim of housing 10.

It will be understood that, when thus assembled, chassis 26, pedestal 27 and pressure plate 20 constitute a rigid unit, resiliently loaded to a stop position determined by ledge (30) abutment against back plate 11, wherein the pressure plate 20 is offset from the plane of the lapped inner wall surface of back plate 11. Assembly or hinged closure of back plate 11 to the camera body necessarily resiliently drives pressure plate 20 against the back surface of any film loaded in the camera, and the pressure plate and associated chassis (26) components assume an intermediate displaced position in which ledge 30 abutment is relieved.

Referring now to FIGS. 4 and 5, individual LED display elements 46 are seen, for the case of the fiber-optics bundle 28, to be mounted in side-by-side array on a substrate 47, suitably ceramic. The designation 27' identifies an upper fragment of the pedestal 27, being suitably slotted and formed to receive and retain the entire fiber-optics bundle 28, with a predetermined offset $\Delta_1$ between substrate 47 and the lower truncation plane of the fiber-optics bundle 28. As a result (for fibers of length $\Delta_2$), the upper truncation plane of the fiber-optics bundle projects above the upper surface of pedestal 27 to the extent $\Delta_3$, being the thickness of the pressure plate 20; in FIG. 5, the film-contacting plane of the pressure plate 20 (and also of the upper truncation plane of the fiber-optics bundle) is designated 20'. It will be understood that the foregoing description for fiber-optics bundle 28 and its associated LED devices 46 applies also for bundle 29 and its associated LED devices, all LED devices being mounted to the substrate 47 and in appropriate array to produce the grouping illustratively recordable at 21'-22'.

LED devices are well known and neither their mechanical/electrical construction nor the means for their electrical operation require description here. It is observed, however, that it is customary to provide LED elements with enclosure structure wherein a magnifying optical lens element overstands the luminable components. Such structure is neither necessary nor preferred in the present device, as is clear from FIGS. 4 and 5; thus, the individual substrate base for each LED device 46 is mounted (as by a conductive epoxy) to the substrate 47, leaving its active face exposed and closely offset from the lower truncation plane of the bundle 28, the offset being designated $\Delta_4$ in FIG. 5. Generally speaking, the luminable components on the face of each LED device 46 (together with associated wire bonds, not shown) account for about 5 mils of offset above the upper face of the individual LED substrate; we therefore prefer an offset $\Delta_4$ of about 10 mils above this upper face, to assure no fiber-optics contact with delicate luminable components or wire bonds carried at the upper face of the individual LED substrate.

FIG. 6 represents a further enlarged fragmentary view of the region of coaction between individual light-transmitting fibers 50 of the bundle 28 and a small segment 51 of a luminable element, which is but one of the seven luminable elements at the upper surface of a typical LED device 46. Each of the fibers 50 is of finely drawn optical quality glass and is circumferentially clad with a glass sheath or sleeve 52, of different refractive index and with preferably a darkening additive component. The bundle 28 is constituted of a dense array of parallel fibers 50, spaced by their cladding sleeves 52, and will be understood to be consolidated by fused adherence at sleeve-to-sleeve contacts; the entire bundle is of unit-handling rectangular-prismatic configuration, with the straight individual fibers 50 perpendicular to smoothly truncated upper and lower parallel end faces of the bundle. The foregoing description of structure of bundle 28 should suffice, in that it is commercially available from Galileo Fiber Optics Co., Sturbridge, Mass.

The light-transmitting capability of each individual fiber 50 derives from multiple longitudinally directed reflections at the fiber-to-sleeve interface for each fiber-sleeve (50-52) element of the bundle. The refractive index of the fiber determines its acceptance angle $\alpha$, and the response spread for any given fiber is a function of its diameter and its acceptance angle $\alpha$; and cladding thickness determines spacing between adjacent fibers. And for given values of these quantities, the end-face offset $\Delta_4'$ to an associated luminable element 51 is selected such that the response spread for each fiber 50 accounts for the particular fiber's own increment of luminable-element transmission capability, without substantial response overlap with the response spread of the next adjacent fiber 50. What has been said with regard to response spread adjacent the light-source component 51 will be understood to apply also to the recording end, namely each fiber's transmitted light being similarly spread in passage through the film to the photographic-emulsion plane, the response spread being such that in passage through the thickness of the film there is no substantial overlap between response spreads of adjacent fibers 50.

It has been observed that no description is needed for the particular modus operandi of the LED devices used in the present recording apparatus. However, it should be noted that, in the case of those LED devices 46 which are used for recording purposes, their time of luminous display, for any given photographic film-exposure frame, is strictly limited as by a timing pulse appropriate for exposure of the particular film speed. Conversely, those LED devices which are used for external display at windows 24-25 of the currently applicable data to be recorded, are preferably viewable as a continuously illuminated display for the entire interval between photographic exposures.

Figure 7:
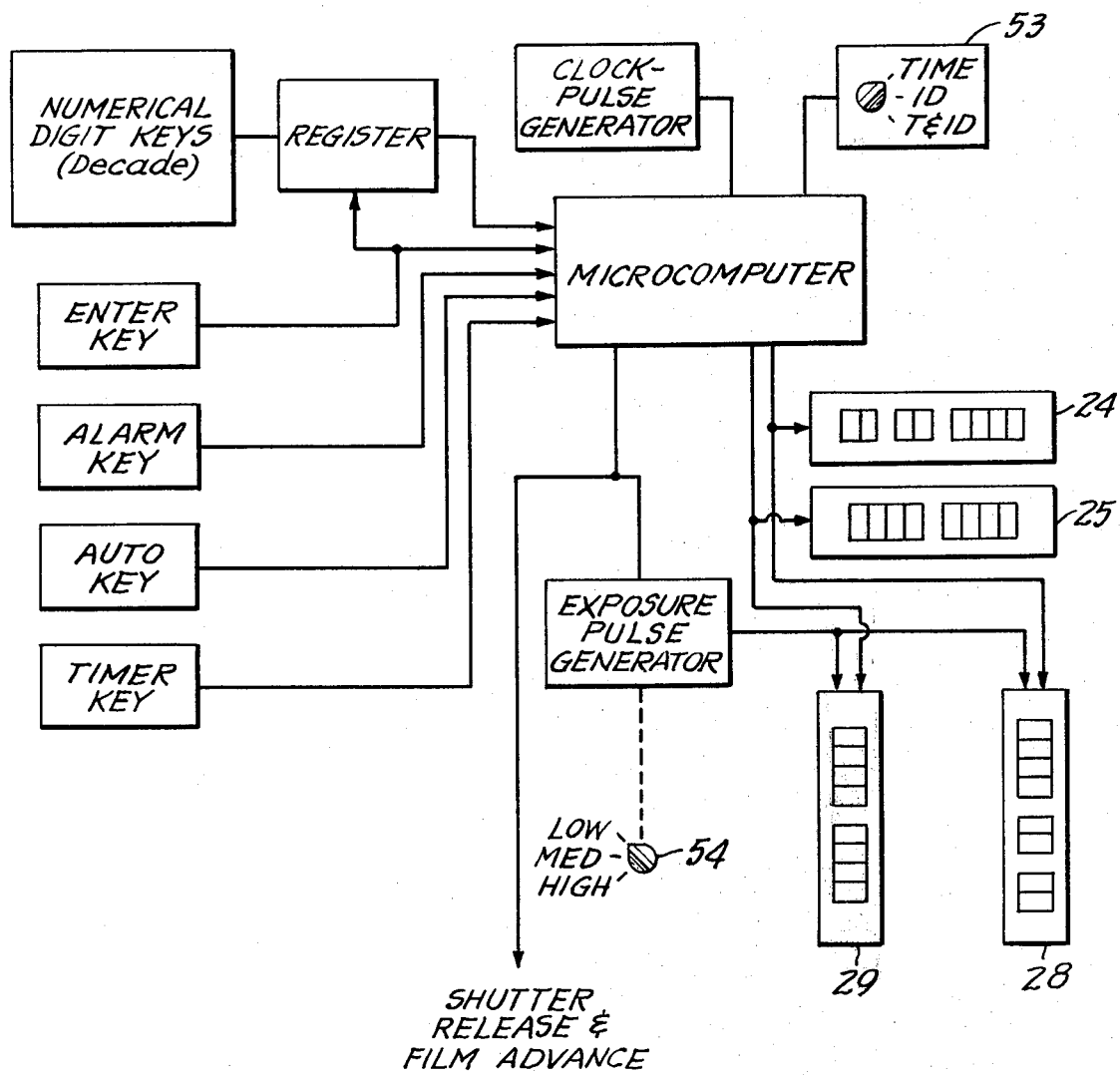
FIG. 7 is a block diagram to show cooperating digital electronic components of the data-recording apparatus.

Referring additionally to FIG. 7 and its legends, the microcomputer within pedestal 27 may be another commercially available product, as of the type #8748 sold by Intel Corporation (i.e., with EPROM capability), and all other integrated circuits may be selected from commercially available products. Using known techniques to interconnect and to program such component products, a wide variety of specialized automatic sequencing and recording functions may be accommodated. For example, taking the selectively operable control inputs suggested by elements and legends shown in FIG. 2 (i.e., directly accessible to and always viewable by the user), the following functions and displays are available:

1. An ON/OFF switch determines whether an internal battery source is to activate illumination of the various digital and and other displays; the power source may be that which is contained within the motor-drive assembly 14, e.g., 7.5 to 12 volts, D.C.

2. At the upper digital display window 24, the array of eight LED devices is grouped for consistency with time inscriptions, being real time in a 24-hour format, with 0.1 second resolution; thus, adjacent successive LED pairs will display hours, minutes, seconds and decimal-tenths of a second, the seventh LED being solely to display the decimal point.

3. The lower display window 25 contains two groups of four light digits, respectively for job and date identification, both to be entered by the user. A decade of numerical keys (e.g., sealed-membrane switches) serves for data entry to the displays.

4. A group of five function keys (e.g., sealed-membrane switches) near the lower edge of the casing 10 provides selective availability of the following:
   (a) MANUAL key—electrically connected to effect transfer of display contents (at 24-25) to the film and also to electrically trigger the camera-shutter release, it being understood that for the described coordination with motor-drive means 14, the film is also thereupon advanced by one frame.
   (b) ALARM key—electrically serves the time entry for an acoustic alarm; the ALARM function enables the user to enter a time (up to 24 hours), upon lapse of which ten short beeps will be emitted.
   (c) AUTO key—electrically serves entry of the time selected as the interval between automatic releases of the shutter, with automatic film advance after each operation of the shutter.
   (d) TIMER key—electrically enables selection as to whether the display at 24 is real time or lapsed time.
   (e) ENTER key—electrically terminates the initial time entry, while also clearing entries for ALARM and AUTO functions, and also clearing the left half of the lower display (at window 25), for entry of new identifying data.

5. A first three-position switch 53 enables selection of whether the display (at 24-25) and the associated recording (at 21'-22') shall involve time alone ("T"-position), identification alone ("ID"-position), or both ("T&ID"-position).

6. A second three-position switch 54 enables selection of the time interval during which the LED's 46 are illuminated for any given frame exposure, with descriptive legends generally correlated with film speed, thereby enabling selection of light-transfer intensity as appropriate for different film speeds. For the three switch positions shown, a "HIGH" selection is optimal at 400 ASA, being recommended for speeds 400 ASA and higher; a "MED" selection is optimal at 200 ASA, being recommended for film speeds 100 to 400 ASA; and a "LOW" selection is optimal at 100 ASA, being recommended for film speeds 25 to 100 ASA. The film-speed switch 54 should be set before entering time, whenever a change of film involves a sufficient change of film speed.

OPERATION

A. Set-up—After switching to the "ON" position, both displays 24–25 will be blank, except that the decimal point is lighted. Using the numerical keys, present time should be entered, in 24-hours format; the entered digits will appear on the upper display 24, the left-most digit first, and it is not necessary to enter trailing zeros. Upon depression of the ENTER key, the right-most digits will start a continuous succession of change (seconds, and 0.1 seconds).

B. Timer—After "Set-Up" as above, a first depression of the TIMER key resets displayed time to zero, and a second TIMER-key depression brings back the display of real time; this can be done at any time during operation.

C. Alarm—Upon a first depression of the ALARM key, the user may prescribe and enter a desired time within which the alarm beeps are to sound; a second depression of the ALARM key restores the on-going display of real time. Subsequent depression of either the ALARM key or the ENTER key aborts the alarm function, it being noted that if a change in the lower display (at 25) is desired, the change must be done before starting the alarm function.

D. When the camera 12 is of the variety having provision for electronic shutter release, the "AUTO" function will enable the user to prescribe and enter a time interval which is to be the period between fully automatic shutter releases. Upon first depression of the AUTO key, the upper display (at 24) is cleared. Using the numerical keys, followed by depression of the ENTER key, the desired interval is entered; for example, 00 02 3[0] [.][0], for a camera-shutter release every 2-½ minutes. Upon depression of the AUTO key a second time, (a) the on-going real-time display will reappear, (b) automatically sequenced and time-separated shutter releases will proceed, and (c) data as appropriate will be exposed (impressed) on the film. Subsequent depression of either the AUTO key or the ENTER key will abort the "AUTO" function, and it is noted that if a change in the lower display (at 25) is desired, the change must be made before starting the "AUTO" function.

The described data-recording device will be seen to meet all stated objects and to bring a vastly enhanced variety of recordable functions and control features to recorded-data photography. The particular timing and data-entry and control features described in detail are intended only to be illustrative, inasmuch as different specific employments may call for recording different kinds of data. The device lends itself with equal facility to tripod-mounted application, to hand-held and viewfinder-framed composition, and to telescope, microscope or other instrument application.

While the invention has been described in detail for a preferred embodiment, it will be understood that modifications may be made without departure from the claimed scope of the invention. For example, it is conceivable that the luminous display of digital data may be other than by means of LED devices, as for example LCD (liquid crystal display) devices in combination with a suitable back lighting source of illumination. The term LED herein is to be understood to be illustrative of merely one such technique, which happens presently to be preferred.

What is claimed is:

1. In a photographic camera wherein film to be exposed is held by a pressure plate against a fixed open frame in the focal plane of an exposure to be made, the pressure plate being resiliently mounted with respect to said frame such that contacting adjacent surfaces of the film and pressure plate are in substantially a common plane, and wherein luminous data pertaining to a given film exposure from a luminous-data source are to be embodied in the film within the frame of the exposure, the improvement in which the pressure plate has at least one aperture in register within a portion of the exposure frame and wherein means including a fiber-optics bundle comprising a dense array of parallel fibers is fixedly carried by said pressure plate and extends through the aperture and to said film-contacting plane, whereby one end of said fiber-optics bundle terminates at said plane, the other end of said fiber-optics bundle terminating in a plane adjacent said luminous data, there being no optical element between the luminous-data source and the adjacent other end of said fiber-optics bundle.

2. The improvement of claim 1, in which the luminous-data source includes LED-element means carried by said pressure plate with a display surface in fixed close adjacency to said other end of said fiber-optics bundle.

3. The improvement of claim 1, in which the luminous-data source includes a plurality of spaced LED elements carried by said pressure plate at a succession of arrayed digit positions, said other end of said fiber-optics bundle being in fixed close adjacency to the LED elements of said array.

4. The improvement of claim 2, in which said LED-element means is one of two, fixedly mounted to said pressure plate and facing in opposite directions, the camera having a viewing window adjacent said other LED-element means, and electrical means controlling the digital display of said other LED-element means to match that produced by the first-mentioned LED-element means.

5. The improvement of claim 4, in which said electrical means includes camera-exposure release control means, and a synchronizing electrical connection between said exposure-control means and said first-mentioned LED-element means.

6. The improvement of claim 4, in which said electrical means includes an interval timer, a digit-indexing control associated with said timer and in digit-indexing relation to both said LED-element means.

7. The improvement of claim 6, in which said electrical means includes camera-exposure release control means having an input connection to said timer.

8. The improvement of claim 2, in which said LED-element means is one of two luminous sources of identically the same data, the camera having a viewing window adjacent said other source of luminous data, and electrical means controlling the transient digital display of said LED-element means for film-recording exposure while controlling the continuous display of said other source for external viewing.

9. The improvement of claim 1 in application to a roll-film camera wherein, between successive exposures, the film is transported from a supply spool to a take-up spool and via the region of contact between said pressure plate and said frame, the camera having a removable back spanning said spools and frame, and said pressure plate being resiliently suspended from said back.

10. The improvement of claim 9, in which said back when fitted over said spools and frame fully encases film against light entry behind the film, said back comprising an inner panel having an opening in registry with the portion of the exposure frame through which the luminous data is carried, said pressure plate being of planiform and area overlapping all borders of the panel opening and being suspended adjacent to and on the inner side of said panel, a housing forming part of said back and encasing the panel opening, and a chassis within said housing and fixed to and therefore resiliently suspended with said pressure plate, said chassis mounting said luminous-data source and said fiber-optics bundle.

11. The improvement of claim 10, in which the suspension of said pressure-plate and chassis comprises four spaced guide pins normal to the plane of film support at the exposure frame, said pins extending rearward and being fixed to said panel outside the area of register with the exposure frame, said guide pins extending through and beyond corresponding guide apertures in said chassis, and spring means referenced to the projecting ends of said guide pins and compressionally urging said chassis in the direction of said panel, and thereby also resiliently loading said pressure plate and said one end of the fiber-optics bundle in the direction of the film-exposure frame and into said common plane.

12. The improvement of claim 2, in which said LED-element means is one of two, facing in opposite directions, the camera having a viewing window adjacent said other LED-element means, and electrical means controlling the digital display of said other LED-element means to match that produced by the first-mentioned LED-element means.

13. In a photographic camera wherein film to be exposed is held by a pressure plate against a fixed open frame in the focal plane of an exposure to be made, the pressure plate being resiliently mounted with respect to said frame such that contacting adjacent surfaces of the film and pressure plate are in substantially a common plane, and wherein an array of luminous data characters pertaining to a given film exposure from luminous-data display means is to be embodied in the film within the frame of the exposure, the improvement in which the pressure plate has at least one aperture in register within a portion of the exposure frame and wherein said luminous-data display means includes an imaging fiber-optics bundle comprising a dense array of parallel fibers of combined section spanning said array and confronting said array at first corresponding ends of said fibers, said fibers being fixedly carried by said pressure plate within the aperture and operative at their opposite ends to present a display of luminous data at said film-contacting plane, there being no optical element between said luminous-data array and the confronting end of said fiber-optics bundle.

14. The improvement of claim 13, in which said luminous-data display means is one of two, the other of said luminous-data display means being viewable externally of the camera.

* * * * *